US010566658B2

(12) United States Patent
Solan et al.

(10) Patent No.: US 10,566,658 B2
(45) Date of Patent: Feb. 18, 2020

(54) LITHIUM-ION GEL BATTERY

(71) Applicant: Commissariat A L'Energie Atomique Et Aux Energies Alternatives, Paris (FR)

(72) Inventors: Sébastien Solan, Seyssinet-Pariset (FR); Laura Boutafa, Echirolles (FR); Lionel Picard, Seyssinet-Pariset (FR); Angèle Ravachol, Grenoble (FR)

(73) Assignee: Commissariat A L'Energie Atomique Et Aux Energies Alternatives, Paris (FR)

( * ) Notice: Subject to any disclaimer, the term of this patent is extended or adjusted under 35 U.S.C. 154(b) by 170 days.

(21) Appl. No.: 15/831,709

(22) Filed: Dec. 5, 2017

(65) Prior Publication Data

US 2018/0123169 A1    May 3, 2018

Related U.S. Application Data

(63) Continuation of application No. PCT/FR2016/052064, filed on Aug. 11, 2016.

(30) Foreign Application Priority Data

Aug. 25, 2015   (FR) ..................... 15 57896

(51) Int. Cl.
*H01M 10/0565*   (2010.01)
*H01M 4/139*      (2010.01)
(Continued)

(52) U.S. Cl.
CPC ..... *H01M 10/0565* (2013.01); *H01M 4/0404* (2013.01); *H01M 4/13* (2013.01);
(Continued)

(58) Field of Classification Search
CPC .... H01M 4/13; H01M 4/1391; H01M 4/1397; H01M 4/139; H01M 4/0404;
(Continued)

(56) References Cited

U.S. PATENT DOCUMENTS 9,088,047 B2 *   7/2015   Giroud ................. H01M 4/136
9,231,276 B2 *   1/2016   Kotato ............. H01M 10/0525
(Continued)

FOREIGN PATENT DOCUMENTS

CA    2 435 218 A1   1/2005
EP    2 833 462 A1   2/2015
(Continued)

OTHER PUBLICATIONS

International Search Report and Written Opinion (Application No. PCT/FR2016/052064) dated Oct. 12, 2016.

*Primary Examiner* — Amanda C. Walke

(57) ABSTRACT

The present invention relates to a lithium-ion battery including: a positive electrode including an active positive electrode material, and advantageously a lithium salt; an electrolyte including a lithium salt; and a negative electrode including an active negative electrode material, and advantageously a lithium salt. In this battery, the positive electrode, the negative electrode, and the electrolyte all three appear in the form of gels, and all three include a polymer and a dinitrile compound of formula N≡C—R—C≡N; R being a hydrocarbon group $C_nH_{2n}$, n being an integer between 1 and 2; the weight ratio of the dinitrile compound to the polymer being in the range from 60/40 to 90/10.

12 Claims, 5 Drawing Sheets

(51) Int. Cl.

| | |
|---|---|
| *H01M 4/485* | (2010.01) |
| *H01M 4/505* | (2010.01) |
| *H01M 4/525* | (2010.01) |
| *H01M 4/58* | (2010.01) |
| *H01M 4/62* | (2006.01) |
| *H01M 10/0525* | (2010.01) |
| *H01M 4/13* | (2010.01) |
| *H01M 4/04* | (2006.01) |
| *H01M 10/0585* | (2010.01) |
| *H01M 4/02* | (2006.01) |
| *H01M 4/1397* | (2010.01) |
| *H01M 4/1391* | (2010.01) |

(52) U.S. Cl.
CPC ........... *H01M 4/139* (2013.01); *H01M 4/485* (2013.01); *H01M 4/505* (2013.01); *H01M 4/525* (2013.01); *H01M 4/5825* (2013.01); *H01M 4/62* (2013.01); *H01M 10/0525* (2013.01); *H01M 10/0585* (2013.01); *H01M 4/1391* (2013.01); *H01M 4/1397* (2013.01); *H01M 2004/023* (2013.01); *H01M 2300/0085* (2013.01)

(58) Field of Classification Search
CPC ...... H01M 4/485; H01M 4/505; H01M 4/525; H01M 4/5825; H01M 4/62; H01M 10/0565; H01M 10/0525; H01M 10/0585
USPC .................................................... 429/483
See application file for complete search history.

(56) References Cited

U.S. PATENT DOCUMENTS

| | | |
|---|---|---|
| 2011/0311864 A1 | 12/2011 | Yamada et al. |
| 2013/0177799 A1 | 7/2013 | Ihara et al. |
| 2017/0018799 A1* | 1/2017 | Jeong ..................... H01M 4/13 |
| 2018/0034101 A1* | 2/2018 | Lee ......................... H01G 11/56 |
| 2018/0138481 A1* | 5/2018 | Solan ................ H01M 10/0525 |
| 2018/0138495 A1* | 5/2018 | Solan ...................... H01M 4/13 |
| 2018/0145370 A1* | 5/2018 | Buisine ................. G02F 1/1525 |
| 2019/0103627 A1* | 4/2019 | Freigang ................... C08F 2/44 |
| 2019/0173126 A1* | 6/2019 | Jeon .................. H01M 10/0561 |

FOREIGN PATENT DOCUMENTS

| | | |
|---|---|---|
| WO | 2007/012174 A1 | 2/2007 |
| WO | 2008/138110 A1 | 11/2008 |

\* cited by examiner

LITHIUM-ION GEL BATTERY

BACKGROUND OF THE INVENTION

1. Field of the Invention

The present invention relates to a lithium battery having electrodes and an electrolyte in gel form. The gel electrodes as well as the gel electrolyte comprise at least one polymer and one dinitrile compound.

The field of use of the present invention particularly concerns power storage.

2. Description of Related Art

Generally, a lithium-ion battery comprises the following elements:
- a positive electrode current collector;
- a positive electrode comprising a lithium cation insertion material;
- an electrolytic component;
- negative electrode;
- a negative electrode current collector;
- a flexible or rigid package.

The lithium cation insertion material of the positive electrode is generally a composite material, for example lithium iron phosphate, $LiFePO_4$, or an oxide of transition metals (laminar materials: $LiCoO_2$: lithium cobalt oxide, $LiNi_{0.33}Mn_{0.33}Co_{0.33}O_2$ ... ).

The electrolytic component separating electrodes of opposite signs is generally formed of a polymer separator or of a microporous composite impregnated with organic electrolyte. The separator provides the mechanical strength, while the electrolyte enables to ensure the displacement of lithium ions from the positive electrode to the negative electrode and conversely (case of a charge or of a discharge), thus generating the current. The electrolyte generally comprises a solvent and a lithium salt such as $LiPF_6$. It is preferably free of water or oxygen traces.

The negative electrode material is generally made of graphite carbon, of silicon or, in the case of power electrodes, of a titanate material ($Li_4Ti_5O_{12}$).

The electrodes and the electrolytic component form the electrochemical core of the battery. Current collectors are generally form one piece with the electrodes and may thus be an integral part of the electrochemical core.

The current collector of the positive electrode is generally made of aluminum while the current collector of the negative electrode is generally made of copper for a negative electrode made of graphite carbon, or of aluminum for a negative electrode made of titanate.

Typically, a battery may comprise a plurality of electrochemical cores in the form of a stack, particularly a face-to-face stack (flat or coiled stack).

According to the concerned applications, the battery package may be flexible or rigid.

As already specified, the presence of an electrolyte enables to ensure the displacement of lithium ions between electrodes of opposite signs. During the preparation of a battery, the electrolyte may be inserted into the cell core by:
- installing of the electrochemical core and of the current collectors in a small bag forming the package, tabs connected to the current collectors coming out of the bag to ensure the current transfer;
- introduction of a liquid electrolyte into the bag;
- sealing of the package, generally by heat sealing, to ensure the tightness of the electrochemical core.

The introduction of the electrolyte thus requires using a liquid electrolyte which impregnates an electrode separator.

On this regard, document CA 2 435 218 describes the use of dinitrile solvent to form a liquid electrolyte containing lithium salts. Further, documents WO 2007/012174 and WO 2008/138110 describe the use of a dinitrile solvent to form an electrolyte supported by a polyolefin-type microporous separator.

Even though the insertion of a liquid electrolyte enables to satisfactorily prepare batteries, there is a need to simplify this method, particularly by using a solid electrolyte.

On the other hand, in the field of flexible batteries, it is also desired to improve the flexibility of the electrolytic component (separator+electrolyte) and of the electrodes.

The present invention addresses these issues due to the developing of a battery having a gel electrochemical core (electrolytic component+electrodes). This battery comprises a gel electrolyte particularly enabling to do away with the use of a conventional separator impregnated with liquid electrolyte.

SUMMARY OF THE INVENTION

The present invention relates to a lithium-ion battery having an electrochemical core (electrolyte+electrodes) in gel form, thus providing the battery with flexibility properties. Due to its gel form, the battery comprises no free solvent.

In the battery according to the invention, the gel form of the electrolyte does not alter the ion conductivity properties required for a proper operation thereof. The same is true for gel electrodes, having performances comparable to those of conventional solid electrodes.

The gel form of the electrolyte and of the electrodes further enables to improve the properties relative to the battery security and flexibility.

More specifically, the present invention relates to a lithium-ion battery comprising:
- a positive electrode comprising an active positive electrode material, and advantageously a lithium salt;
- an electrolyte comprising a lithium salt;
- a negative electrode comprising an active negative electrode material, and advantageously a lithium salt.

In such a lithium-ion battery, the positive electrode, the negative electrode, and the electrolyte all three appear in the form of gels, and all three comprise a polymer and a dinitrile compound of formula N≡C—R—C≡N;

R being a hydrocarbon group $C_nH_{2n}$, n being an integer between 1 and 2;

the weight ratio of the dinitrile compound to the polymer being in the range from 60/40 to 90/10.

In other word, the battery according to the invention comprises:
- a positive electrode in gel form comprising an active positive electrode material, a polymer, a dinitrile compound, and advantageously a lithium salt;
- a gel electrolyte comprising a lithium salt, a polymer, and a dinitrile compound;
- a negative electrode in gel form comprising an active negative electrode material, a polymer, a dinitrile compound, and advantageously a lithium salt.

The electrolyte being in gel form, the battery according to the invention requires no conventional separator. The gel electrolyte enables to both ensure the displacement of lithium ions and the electrode separator function.

The dinitrile compound used has a melting point advantageously higher than 20° C., thus easing the manipulation of the electrolyte and of the electrodes during the preparation of the battery according to the invention. The dinitrile compound corresponds to the solvent of the electrolytic medium. It forms a same medium within all the battery compartments.

Advantageously, the dinitrile compound is succinonitrile (n=2) or malononitrile (n=1).

According to a specific embodiment, the dinitrile compound used to prepare the three "gel" components (electrodes+electrolyte) of the electrochemical core of the battery according to the invention is succinonitrile.

Succinonitrile is a non-volatile non-flammable hyperplastic crystalline organic compound (266° C. boiling point) having a melting point at 57° C. The temperature range within which it may be used is between −20° C. to 250° C. As an example, a solution of 1 M of LiTFSi salt in succinonitrile has an ion conductivity in the order of $3 \cdot 10^{-3}$ $S \cdot cm^{-1}$ at 20° C.

Generally, the dinitrile compound particularly enables to solubilize the lithium salt of the electrolyte and possibly of the electrodes. Further, its combination with a polymer provides a gel.

To obtain a gel, the weight ratio of the dinitrile compound to the polymer is in the range from 60/40 to 90/10, more advantageously from 65/35 to 75/25, and more advantageously still in the order of 70/30.

The polymer used in the invention is advantageously selected from the group comprising poly(styrene-co-acrylonitrile); poly(butylmethacrylate-co-isobutylmethacrylate); poly(butylmethacrylate); poly(isobutylmethacrylate); poly(butylmethacrylate-co-methylmethacrylate); poly(methyl methacrylate) (PMMA); poly(vinylidene fluoride-hexafluoropropylene) (PVdF-HFP); polyoxoethylene (POE); and polyvinylpyrrolidone (PVP).

The lithium salt used in the electrolyte, and possibly in the positive electrode and/or the negative electrode, is advantageously selected from the group comprising LiTFSi (lithium bis-trifluoromethanesulfonimide); LiBOB (lithium bis(oxalato)borate); $LiPF_6$; $LiClO_4$; $LiBF_4$; $LiAsF_6$; $LiCF_3SO_3$; $LiN(CF_3SO_2)_3$; $LiN(C_2F_5SO_2)$; and mixtures thereof.

In the electrolyte, the lithium salt concentration is advantageously in the range from 0.5 to 5 M in the dinitrile compound, more advantageously in the order of 1 M, in particular.

Further, the [dinitrile compound+lithium salt]/[polymer] weight ratio is advantageously in the range from 60/40 to 90/10, more advantageously in the order of 70/30. Such a ratio enables to keep adequate properties in terms of ion conductivity provided by the [dinitrile compound+lithium salt] mixture and of mechanical behavior provided by the polymer.

Advantageously, the positive electrode, the negative electrode, and the electrolyte of the battery according to the invention comprise the same polymer and/or the same dinitrile compound and/or the same lithium salt.

More advantageously still, the positive electrode, the negative electrode, and the electrolyte (electrolyte separator formed by a polymer membrane gelled by the dinitrile/lithium salt electrolyte) of the battery according to the invention comprise the same polymer, the same dinitrile compound, and the same lithium salt.

The active materials of the positive and negative electrodes capable of being used in the battery according to the invention particularly correspond to the conventional materials described in literature (Tarascon et al., Nature, 2001, 414, 359-367).

As an example, the following may in particular be mentioned:
$LiFePO_4$ (LFP) and $LiNi_{0.33}Mn_{0.33}Co_{0.33}O_2$ (NMC) for the positive electrode; and
$Li_4Ti_5O_{12}$—type titanate (LTO), graphite carbon; sulfur; metal lithium; and silicon for the negative electrode.

The active material may amount to from 50 to 95 wt. % the electrode (positive or negative), more advantageously from 80 to 70 wt. %.

Generally, an active silicon material (negative electrode) undergoes a significant volume deformation during charge and discharge cycles, conversely to LFP-, NMC-, or LTO-type materials. Such a deformation may reach 300% between the fully charged state and the fully discharged state, thus causing the progressive destruction of the electrode structure. Accordingly, a conventional electrode based on silicon has a limited lifetime. The present invention also enables to solve this problem, the gel form enabling to adapt the mechanical properties of the electrodes to compensate for volume variations, and this, without compromising the electrode structure.

Apart from the active material, the electrodes advantageously comprise at least one electronic conductor. It may in particular be carbon black and/or carbon fibers. It may amount to from 1 to 10 wt. % of the electrode, more advantageously from 3 to 5 wt. %.

As already indicated, the electrodes may comprise a lithium salt. In the present invention, the gel electrolyte is directly integrated with the electrode materials in the formulation as an electrolyte and electrode binder. Conversely to prior art, it is thus not necessary to add a liquid electrolyte once the battery has been assembled.

The lithium salt concentration in the electrodes (positive or negative) is advantageously in the range from 0.5 to 5 M in the dinitrile compound, more advantageously in the order of 1 M.

In the positive electrode, the polymer+dinitrile compound advantageously amounts to from 20 to 60 wt. % of the positive electrode, more advantageously from 30 to 40 wt. %.

In the negative electrode, the polymer+dinitrile compound advantageously amounts to from 20 to 60 wt. % of the negative electrode, more advantageously from 30 to 40 wt. %.

The electrodes are advantageously associated with a porous current collector. The current collector of the positive electrode and/or of the negative electrode is advantageously a carbon nonwoven.

The use of a carbon nonwoven for the two electrodes enables to keep the flexibility properties of the gel electrodes. It also enables to avoid corrosion problems, generally encountered when the active NMC-type electrode materials are used in the presence of LiTFSi-type lithium salt and of a conventional aluminum current collector. Thus, according to a preferred embodiment, each of the electrodes of the battery according to the invention is associated with a current collector formed of a carbon nonwoven.

The battery according to the invention advantageously is a flexible battery. It may also comprise a plurality of gel electrochemical cores (electrodes+electrolytes).

According to a specific embodiment, the battery comprises a flexible package. The latter is generally made of a multilayer composite material, for example, a stack of aluminum layers covered with a polymer of polyethylene, propylene, or polyamide type. The flexible package may also comprise an adhesive layer which may be made of polyester-polyurethane.

The present invention also relates to a method of preparing such a lithium-ion battery. The method comprises the steps of:

a/ preparing a gel electrolyte by:
  preparing a solution of lithium salt in a dinitrile compound of formula N≡C—R—C≡N, R being a hydrocarbon group $C_nH_{2n}$, n being an integer between 1 and 2;
  forming an electrolyte ink by mixing this solution with a polymer, the weight ratio of the dinitrile compound to the polymer being in the range from 60/40 to 90/10;
  forming a gel electrolyte;

b/ preparing a positive gel electrode by:
  preparing a positive electrode ink containing an active positive electrode material, a polymer, and a dinitrile compound having formula N≡C—R—C≡N, R being a hydrocarbon group $C_nH_{2n}$, n being an integer between 1 and 2, the weight ratio of the dinitrile compound to the polymer being in the range from 60/40 to 90/10;
  forming a positive gel electrode, advantageously by depositing the positive electrode ink on a current collector;

c/ preparing a negative gel electrode by:
  preparing a negative electrode ink containing an active negative electrode material, a polymer, and a dinitrile compound having formula N≡C—R—C≡N, R being a hydrocarbon group $C_nH_{2n}$, n being an integer between 1 and 2, the weight ratio of the dinitrile compound to the polymer being in the range from 60/40 to 90/10;
  forming a negative gel electrode, advantageously by depositing the negative electrode ink on a current collector;

d/ preparing a battery by assembly of the positive electrode/electrolyte/negative electrode stack;

e/ optionally packing the battery thus formed, advantageously in a flexible package.

The electrolyte, as well as the electrodes, may be formed by a method involving a solvent or UV rays (crosslinking by exposure to an ultraviolet radiation).

In other words, the gelling may be performed by evaporation of a solvent or by crosslinking of the polymer.

The solvent method comprises diluting the "dinitrile compound/polymer" mixture in a dilution solvent (SD). In this case, the ink (electrolyte and/or electrode) of steps a/ to c/ comprises solvent SD. The gelling is performed by evaporation of solvent SD.

Thus, according to a specific embodiment, the ink of steps a/ to c/ comprises a solvent SD, the gel electrolyte and of the positive and negative electrodes being formed by evaporation of solvent SD.

Solvent SD is advantageously selected from the group comprising N-methyl-2-pyrrolidone (NMP), methyl ethyl ketone (MEK), dimethylformamide (DMF), tetrahydrofuran (THF), and acetone.

At step a/, the solution of lithium salt in a dinitrile compound may be diluted in solvent SD prior to being mixed with a polymer.

In the case of the electrodes forming (steps a/ and b/), solvent SD may be introduced in the presence of the active electrode material, of the polymer, and of the dinitrile compound.

The poly(styrene-co-acrylonitrile) and poly(vinylidene fluoride-hexafluoropropylene) (PVdF-HFP) polymers are particularly adapted to the solvent method.

The forming of the gel electrolyte and of the positive and negative electrodes may also be carried out by crosslinking of the polymer, by exposure to an ultraviolet radiation.

At step a/, the UV method comprises forming the gel electrolyte by crosslinking of the polymer, by exposure to an ultraviolet radiation. In this case, the solution of lithium salt in a dinitrile compound is not diluted in a solvent (SD) prior to being mixed with a polymer.

At steps b/ and c/, the UV method comprises preparing a mixture containing the dinitrile compound, the polymer, the active electrode material, possibly at least one electronic conductor and/or a lithium salt, and then crosslinking the polymer by exposure to an ultraviolet radiation.

The poly(butylmethacrylate-co-isobutylmethacrylate), poly(butyl methacrylate), poly(isobutylmethacrylate), poly(butylmethacrylate-co-methyl methacrylate), poly(methylmethacrylate) polymers are particularly adapted to the UV method.

The crosslinking is ensured by the presence of a crosslinking agent. It will be within the abilities of those skilled in the art to select the adequate crosslinking agent.

The electrode ink deposition may be performed by various conventional deposition techniques, particularly by spreading, by printing (silk-screening, inkjet . . . ), or by sputtering.

The forming of the electrolyte may also comprise a step of deposition according to one of these techniques. In this case, the mixture particularly comprising the polymer and the dinitrile compound is deposited before the evaporation of the possible solvent SD or before the crosslinking of the polymer.

Thus, the battery according to the invention may be formed by successive depositions, advantageously by printing:
  of an electrode ink on a substrate, to form a first electrode;
  of an electrolyte ink on the first electrode;
  of an electrode ink on the electrolyte, to form a second electrode having a sign opposite to that of the first electrode.

The substrate having the ink forming the first electrode deposited thereon advantageously is a carbon substrate, more advantageously a carbon nonwoven.

Generally, it is preferable for the dinitrile compound to be soluble in the compounds used (UV or solvent method) to obtain a homogeneous mixture of the components.

In the battery according to the invention, the gelling of the electrochemical core (electrolyte+electrodes) has the following advantages:
  improvement of the manufacturing process due to the absence of the step of filling with a liquid electrolyte;
  security improvement, the dinitrile compound used being non-flammable and non-toxic;
  obtaining of a flexible, or even deformable, battery;
  possibility of new all-solid-state battery configurations, for example, in three-dimensional form, in the form of wires or of cables;
  possibility of insertion of these new battery configurations in a textile, for example;
  improvement of the electrochemical stability;
  increase of the range of temperatures of use: from −20° C. to 250° C.
  possibility of printing the battery on a polymer substrate.

The invention and the resulting advantages will better appear from the following non-limiting drawings and examples, provided as an illustration of the invention.

DETAILED DESCRIPTION OF THE INVENTION

Several examples of gel electrochemical systems according to the invention have been prepared and used in half-cell or cell configuration.

a) Preparation of the Gel Electrolyte According to the Invention:

LiTFSi (lithium bis-trifluoromethanesulfonimide) and LiBOB (lithium bis(oxalato)borate) lithium salts are solubilized at high temperature in a dinitrile compound (succinonitrile or malononitrile, which are solid at room temperature) at 0.8 M for LiTFSi and 0.2 M for LiBOB.

Figure 1:
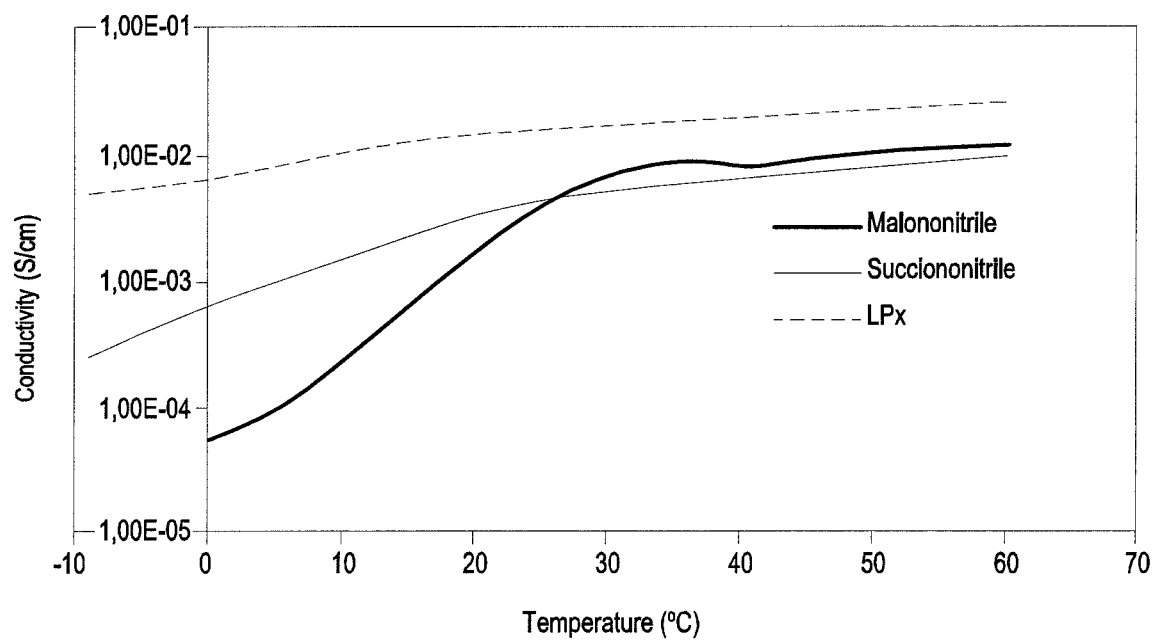
FIG. 1 illustrates the ion conductivity between −10° C. and 60° C. of liquid electrolytes.

FIG. 1 shows the ion conductivity measurements made on these solutions between −10 and 60° C. and compared with a conventional liquid electrolyte compatible with a use in a lithium-ion system (LPx: electrolyte of the type EC/PC/DMC+1 M of $LiPF_6$; EC=ethylene carbonate, PC=propylene carbonate, DMC=dimethyl carbonate).

Such solutions of lithium salts in a dinitrile compound are then mixed with the polymers which will be used a gelling matrixes (table 1).

The mixture is performed by a solvent method (addition of the solution of salt diluted in a solvent with a 40% dry extract) or by a UV method (addition of the salt solution at 0.8 or 0.2 M).

The solvent method provides a gel electrolyte after evaporation of the solvent (generally of N-methyl-2-pyrrolidone NMP, methyl ethyl ketone MEK, dimethylformamide DMF, tetrahydrofuran THF, or acetone type).

The UV method provides a gel electrolyte by crosslinking of the polymer by exposure to an ultraviolet radiation.

In all examples, the weight ratio of the dinitrile compound to the polymer is equal to 70/30.

Prior to the forming of the gel electrolyte (by evaporation of the solvent or by UV crosslinking), the different mixtures are spread on a polymer substrate (poly(ethylene terephthalate), PET) or glass to obtain gel electrolytes having a thickness from 40 to 90 μm.

Generally, the preparation of the gel electrolytes according to the invention may be performed in anhydrous or non-anhydrous conditions, and this, without influencing the properties of the gel electrolyte. However, gel electrolytes intended to be integrated in a lithium metal system are formed in anhydrous conditions to avoid any presence of water.

TABLE 1

Composition, obtaining conditions, and properties of gel electrolytes according to the invention.

| Example | Polymer | Dinitrile compound | Lithium salt | Method |
|---|---|---|---|---|
| INV-1 | PStyA | succinonitrile | LiTFSi | S (acetone) |
| INV-2 | A | succinonitrile | LiTFSi | UV |
| INV-3 | B | succinonitrile | LiTFSi | UV |
| INV-4 | C | succinonitrile | LiTFSi | UV |
| INV-5 | D | succinonitrile | LiTFSi | UV |
| INV-6 | PMMA | succinonitrile | LiTFSi | S (acetone) |
| INV-7 | PVdF-HFP | succinonitrile | LiTFSi | S (acetone) |

| Example | Thickness (μm) | Elongation | Homogeneity |
|---|---|---|---|
| INV-1 | 60 | 2 | 4 |
| INV-2 | 60 | 2 | 3 |
| INV-3 | 60 | 4 | 3 |
| INV-4 | 60 | 1 | 2 |
| INV-5 | 60 | 2 | 1 |
| INV-6 | 60 | 4 | 4 |
| INV-7 | 60 | 4 | 4 |

PStyA: poly(styrene-co-acrylonitrile)

Polymer A: poly(butylmethacrylate-co-isobutylmethacrylate)

Polymer B: poly(butylmethacrylate)

Polymer C: poly(isobutylmethacrylate)

Polymer D: poly(butylmethacrylate-co-methylmethacrylate)

PMMA polymer: poly(methylmethacrylate)

PVdF-HFP polymer: poly(vinylidene fluoride-hexafluoropropylene); Solvay reference 21216

S method: solvent method, forming of the electrolyte by evaporation of the solvent UV method: forming of the electrolyte by crosslinking of the polymer by exposure to an ultraviolet radiation Elongation and homogeneity: the classification has been performed visually, grade 4 indicating the best mechanical properties.

Figure 2:
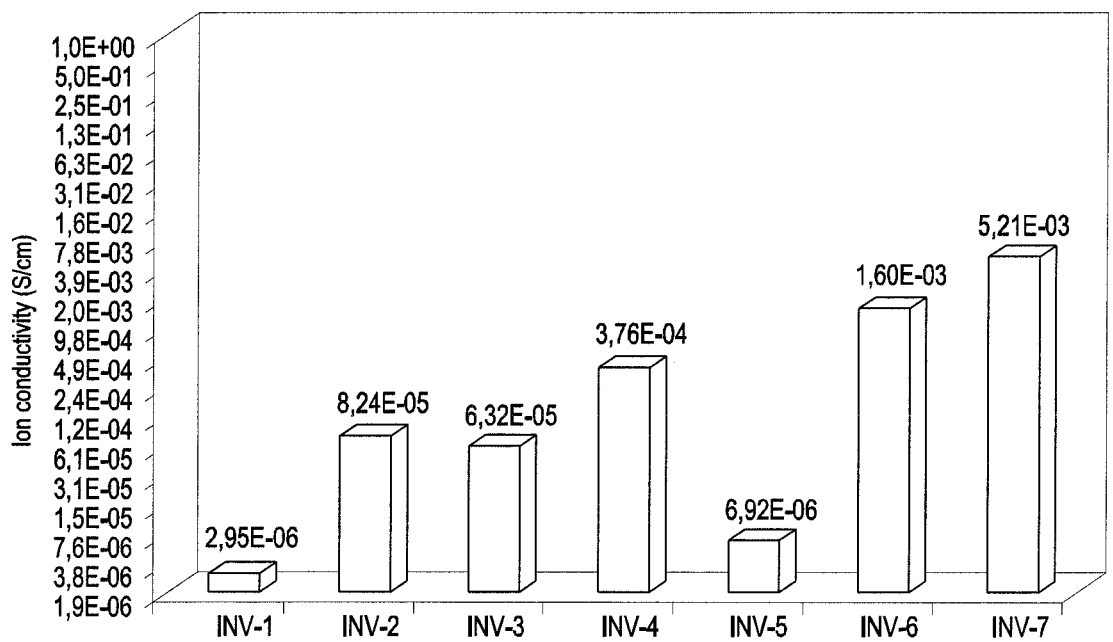
FIG. 2 illustrates the ion conductivity of gel electrolytes according to the invention.

Gel electrolytes INV-1 to INV-7 have been characterized in terms of ion conductivity (FIG. 2).

Figure 3:
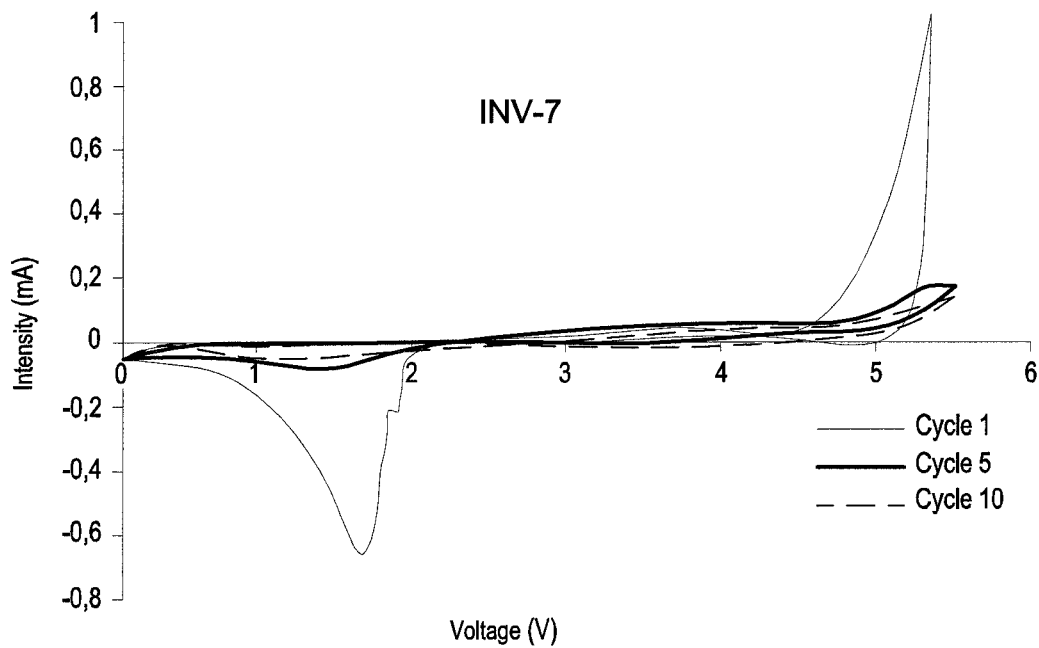
FIG. 3 illustrates the cyclic voltammetry diagram of a gel electrolyte according to the invention.
Figure 4:
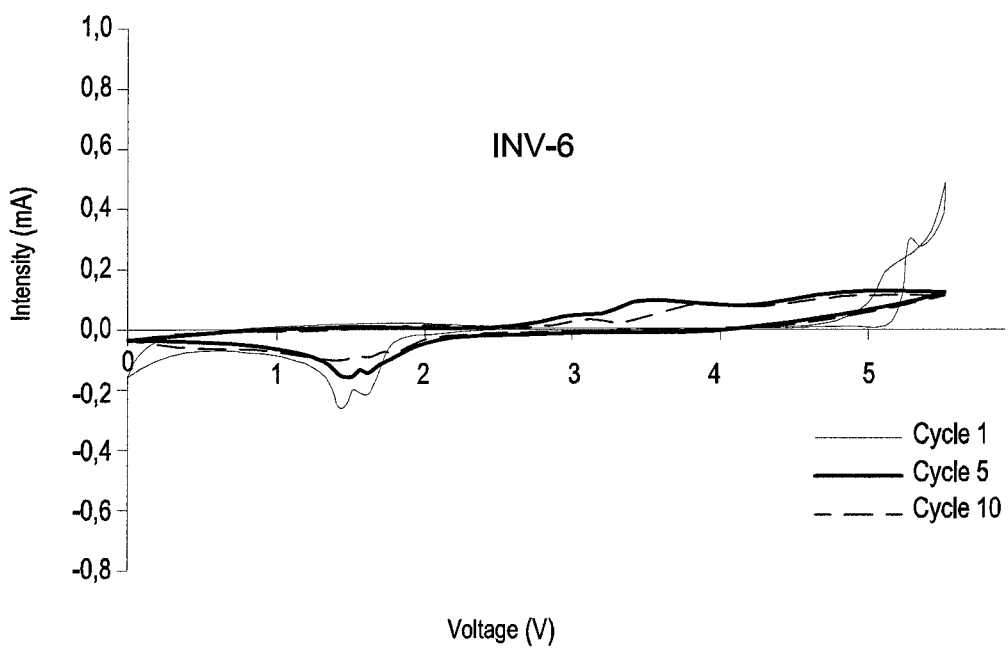
FIG. 4 illustrates the cyclic voltammetry diagram of a gel electrolyte according to the invention.

Gel electrolytes INV-6 and INV-7 have the best conductivity and the most optimized mechanical properties. These two gel electrolytes are stable up to 5 V towards lithium and can thus be used in metal lithium and lithium-ion configuration for all conventionally-used electroactive materials (FIGS. 3 and 4).

b) Preparation of Half-Cells and of Cells Comprising a Gel System According to the Invention:

Preparation of the Gel Electrolytes:

The half-cells and the cells comprising the gel system according to the invention have been prepared from the electrolytes (table 2) and the electrodes (table 3) described hereafter.

TABLE 2

Compositions and obtaining conditions of gel electrolytes according to the invention.

| Example | Polymer | Dinitrile compound | Lithium salt | Method |
|---|---|---|---|---|
| INV-8 | PVdF-HFP | succinonitrile | LiTFSi | S (acetone) |
| INV-9 | PVdF-HFP | succinonitrile | LiBOB | S (acetone) |

The following formulation (ink) has been used:
PVdF-HFP: 15 wt. %;
succinonitrile: 35 wt. %;
LiTFSi: 0.8 M in succinonitrile;
LiBOB: 0.2 M in succinonitrile;
acetone: quantity adjusted to obtain a 46 wt. % dry extract.

For examples INV-8 and INV-9, the succinonitrile/polymer/lithium salt/acetone mixture is spread on a PET-type polymer substrate, and then dried at 60° C. for 2 hours to remove the formulation solvent (acetone).

The deposit once dried forms a gel that can be manipulated and separated from its substrate. It is then cut to a 16-mm diameter by means of a die to be assembled at a button cell format.

Preparation of the Gel Electrodes According to the Invention:

To form a totally gelled system, gel electrodes have been prepared by integrating a dinitrile compound and a polymer (table 3).

TABLE 3

Composition of the gel electrodes according to the invention.

| Electrode | LFP (positive) | NMC (positive) | LTO (negative) |
|---|---|---|---|
| Active material | LiFePO$_4$ | LiNiMnCoO$_2$ | Li$_4$Ti$_5$O$_{12}$ |
| Electron conductor | carbon black + carbon fibers | | |
| Polymer | PVdF-HFP or PMMA | | PVdF-HFP |
| Electrolyte solvent | succinonitrile | | |
| Lithium salt | LiTFSi or LiBOB | | |
| Formulation solvent | dimethyl formamide (DMF) | | |

For positive electrodes, the following formulation (ink) has been used:
LiFePO$_4$ or LiNiMnCoO$_2$: 48 wt. %;
carbon black (Timcal Super P): 1 wt. %;
carbon fibers (Showa Denko VGCF-H): 1 wt. %;
PVdF-HFP: 15 wt. %;
succinonitrile: 35 wt. %;
LiTFSi: 0.8 M in succinonitrile;
LiBOB: 0.2 M in succinonitrile;
DMF: quantity adjusted to obtain a 40 wt. % dry extract.

For the negative electrode, the following formulation (ink) has been used:
Li$_4$Ti$_5$O$_{12}$: 48 wt. %;
carbon black (Timcal Super P): 1 wt. %;
carbon fibers (Showa Denko VGCF-H): 1 wt. %;
PVdF-HFP: 15 wt. %;
succinonitrile: 35 wt. %;
LiTFSi: 0.8 M in succinonitrile;
LiBOB: 0.2 M in succinonitrile;
DMF: quantity adjusted to obtain a 40 wt. % dry extract.

Preparation of the Gel Battery Systems of the Invention:

Both formulations (positive and negative electrode inks) are then spread, and then dried at 60° C. for 24 hours on a carbon substrate formed of a carbon nonwoven. The use of a carbon nonwoven enables to favor the bonding and to suppress corrosion problems generally encountered when the NMC material and the LiTFSi salt are deposited on aluminum.

The composition of the obtained ink may change according to the material used and to the targeted application. Thus, by varying the ratio of active material and the spreading thickness of the formulated inks on the current collector, it is possible to control the grammage of the electrode, that is, the mass of active material per surface area unit. Generally, the mass per surface area unit is directly translated in surface area capacity relative to the specific capacity (mAh·cm$^{-2}$) of the considered material.

Once the electrode ink has been spread or printed and dried on the carbon nonwoven collector, chips are cut at a 14-millimeter diameter by means of a die, and then weighted. The weighting enables to know the mass of active material contained in the chip. It is then possible to know the capacity (mA·h) of the chip.

The mass of active material in the chip is determined by means of the following relation:

$$m_{MA}=(m_{tot}-m_{collector})*\%(MA)$$

where $m_{MA}$, $m_{tot}$ and $m_{collector}$ respectively represent the mass of active material, the total mass of the chip, and the mass of the current collector. The masses are expressed in milligrams (mg). Notation % (MA) represents the percentage of active material in the electrode formulation.

The chip capacity ($C_{chip}$) in mA·h can then be calculated:

$$C_{chip}=m_{MA}*C_{MA}*1000$$

$C_{MA}$ representing the specific capacity of the active material in mA·h·g$^{-1}$.

The specific capacities used for the calculations of the capacities are recorded in table 4.

TABLE 4

Specific capacities for the main electrode materials used.

| Material | Specific capacity (mAh · g$^{-1}$) |
|---|---|
| LTO (Li$_4$Ti$_5$O$_{12}$) | 160 |
| NMC (LiNi$_{0.33}$Mn$_{0.33}$Co$_{0.33}$O$_2$) | 170 |
| LFP (LiFePO$_4$) | 160 |

Once the chips have been characterized (mass, thickness, and capacity), they are dried in vacuum at 80° C. for 48 hours before being used to assemble button cells in an inert environment. Conversely to conventional systems, no step of adding a liquid electrolyte or vacuum impregnation phase is required.

Generally, the electrodes are not calendered, conversely to conventional electrodes. Indeed, calendering may generate the exudation of the electrolyte out of the polymer matrix. Further, the use of a carbon substrate makes this step unnecessary.

c) Cell Tests

Once the electrodes and the gel electrolyte according to the invention have been assembled at the button cell format, they are characterized on a cycling bench to assess their electrochemical performance.

Figure 7:
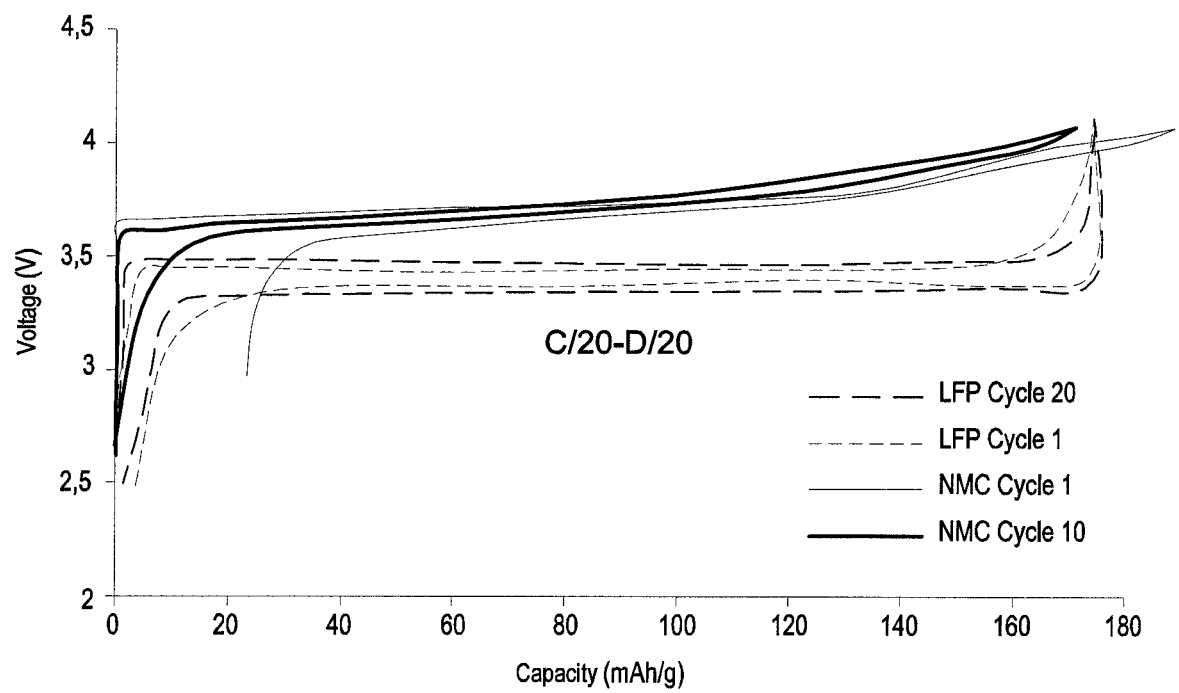
FIG. 7 illustrates the voltage according to the specific capacity of gel systems according to the invention.
Figure 8:
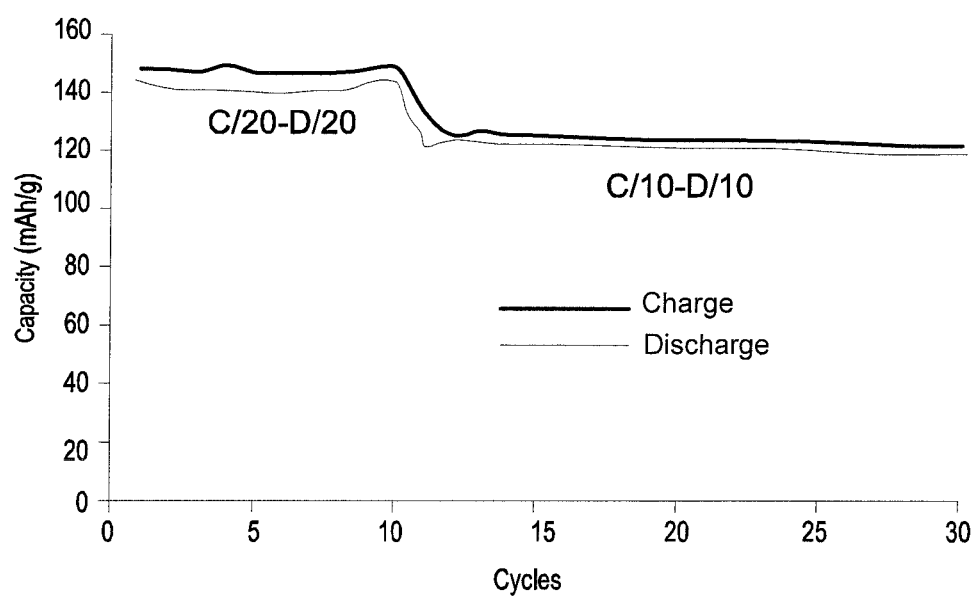
FIG. 8 illustrates the specific capacity of a cell comprising a gel system according to the invention for different charge and discharge modes.
Figure 9:
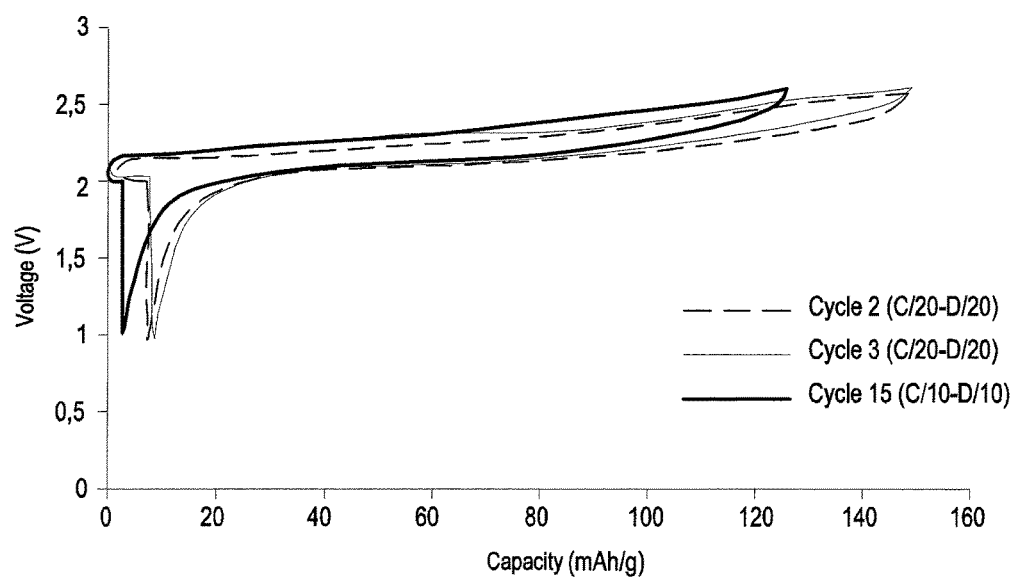
FIG. 9 illustrates the specific capacity of a cell comprising a gel system according to the invention.

Two types of configurations have been assessed:
half-cell configuration: a positive electrode material (LFP or NMC) opposite the metal lithium (FIGS. 5 to 7);
full system configuration: a positive electrode (NMC) opposite a negative electrode (LTO) (FIGS. 8 and 9).

Half-Cell Configuration: NMC vs. Metal Lithium (FIGS. 5 and 7)

Figure 5:
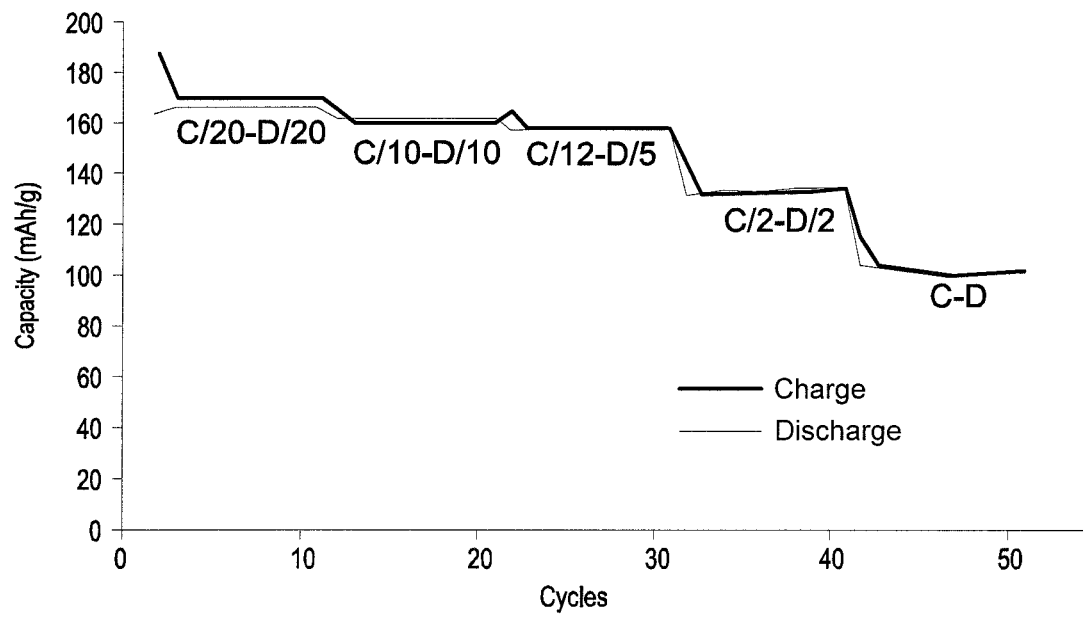
FIG. 5 illustrates the specific capacity of a positive electrode for different charge and discharge modes, in a half-cell comprising a gel system according to the invention.

As shown in FIG. 5, the obtained specific capacities are similar to the theoretical specific capacity of the NMC material (170 mA·h·g$^{-1}$).

Further, and surprisingly, the gel system according to the invention enables to provide 100 mA·h·g$^{-1}$ at a high rate (C/D), which corresponds to a full charge and discharge within 1 hour.

The observed results are very stable, there is no loss of capacity along cycles.

Half-Cell Configuration: LFP vs. Metal Lithium (FIGS. 6 and 7)

Figure 6:
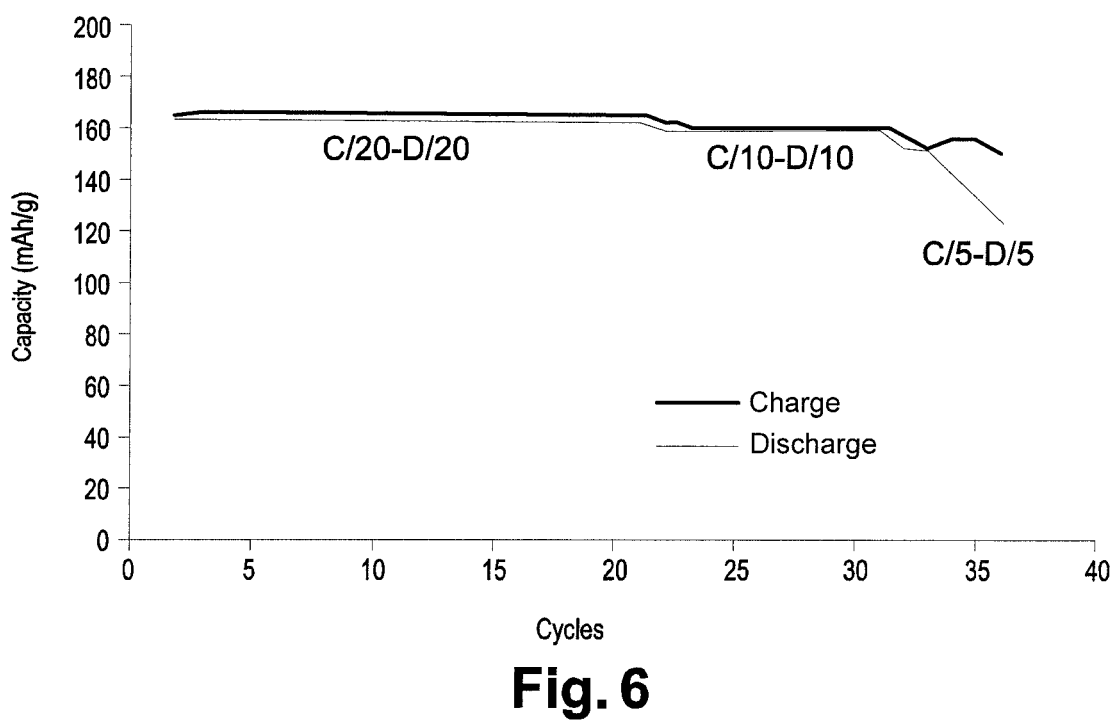
FIG. 6 illustrates the specific capacity of a positive electrode for different charge and discharge modes, in a half-cell comprising a gel system according to the invention.

As shown in FIG. 6, the specific capacities provided by the LFP/metal Li system are similar to the theoretical specific capacity of the LFP material (160 mA·h·g$^{-1}$).

However, the LFP material being less electronically conductive than the NMC material, the obtained capacity drops quite rapidly for rates higher than C/10-D/10.

As shown in FIG. 7, the two NMC/Li and LFP/Li systems have charge and discharge courses comparable with the best formulations of literature with very low polarizations.

Full System Configuration: NMC vs. LTO (FIGS. 8 and 9)

FIGS. 8 and 9 show that the gel NMC/LTO system is functional and very stable along cycles. Further, the obtained capacities are slightly smaller than the theoretical specific capacities (150 instead of 160 mA·h·g$^{-1}$).

The invention claimed is:

1. A lithium-ion battery comprising:
   a positive electrode comprising an active positive electrode material;
   an electrolyte comprising a lithium salt; and
   a negative electrode comprising an active negative electrode material,
   wherein each of the positive electrode, the negative electrode, and the electrolyte have a gel form, and wherein each of the positive electrode, the negative electrode and the electrolyte comprises a polymer and a dinitrile compound having a formula of N≡C—R—C≡N, wherein R is a hydrocarbon group $C_nH_{2n}$, wherein n is an integer between 1 and 2, and wherein a weight ratio of the dinitrile compound to the polymer is in a range of 60/40 to 90/10.

2. The lithium-ion battery of claim 1, wherein the dinitrile compound is succinonitrile or malononitrile.

3. The lithium-ion battery of claim 1, wherein the weight ratio of the dinitrile compound to the polymer is in a range of 65/35 to 75/25.

4. The lithium-ion battery of claim 1, wherein the polymer is selected from the group consisting of poly(styrene-co-acrylonitrile), poly(butylmethacrylate-co-isobutylmethacrylate), poly(butylmethacrylate), poly(isobutylmethacrylate), poly(butylmethacrylate-co-methylmethacrylate), poly(methylmethacrylate), poly(vinylidene fluoride-hexafluoropropylene), polyethylene oxide, and polyvinylpyrrolidone.

5. The lithium-ion battery of claim 1, wherein the lithium salt is selected from the group consisting of lithium bis-trifluoromethanesulfonimide, lithium bis(oxalato)borate), $LiPF_6$, $LiClO_4$, $LiBF_4$, $LiAsF_6$, $LiCF_3SO_3$, $LiN(CF_3SO_2)_3$, $LiN(C_2F_5SO_2)$, and mixtures thereof.

6. The lithium-ion battery of claim 1, wherein the lithium salt in the electrolyte has a concentration in a range of 0.5 to 5 M in the dinitrile compound.

7. The lithium-ion battery according to claim 1, wherein the positive electrode further comprises a lithium salt.

8. The lithium-ion battery according to claim 1, wherein the negative electrode further comprises a lithium salt.

9. A method of preparing the lithium-ion battery of claim 1, comprising the steps of:
   (a) preparing a gel electrolyte by
      preparing a solution of lithium salt in a dinitrile compound having the formula of N≡C—R—C≡N, wherein R is a hydrocarbon group $C_nH_{2n}$, and wherein n is an integer between 1 and 2,
      forming an electrolyte ink by mixing the solution with a polymer, wherein a weight ratio of the dinitrile compound to the polymer is in a range from 60/40 to 90/10, and
      forming the gel electrolyte;
   (b) preparing a positive gel electrode by
      preparing a positive electrode ink containing an active positive electrode material, a polymer, and a dinitrile compound having the formula of N≡C—R—C≡N, wherein R is a hydrocarbon group $C_nH_{2n}$, wherein n is an integer between 1 and 2, and wherein a weight ratio of the dinitrile compound to the polymer is in a range of 60/40 to 90/10, and
      forming the positive gel electrode by depositing the positive electrode ink on a current collector;
   (c) preparing a negative gel electrode by
      preparing a negative electrode ink containing an active negative electrode material, a polymer, and a dinitrile compound having the formula of N≡C—R—C≡N, wherein R is a hydrocarbon group $C_nH_{2n}$, wherein n is an integer between 1 and 2, and wherein a weight ratio of the dinitrile compound to the polymer is in a range of 60/40 to 90/10, and
      forming the negative gel electrode by depositing the negative electrode ink on a current collector; and
   (d) preparing a battery by assembling a stack comprising the positive gel electrode, the gel electrolyte, and the negative gel electrode.

10. The lithium-ion battery preparation method of claim 9, wherein the inks of steps (a) to (c) comprise a solvent (SD), and wherein the steps of forming the gel electrolyte, the positive gel electrode and the negative gel electrode are performed by evaporating the solvent SD.

11. The lithium-ion battery preparation method of claim 10, wherein solvent SD is selected from the group consisting of N-methyl-2-pyrrolidone, methyl ethyl ketone, dimethylformamide, tetrahydrofuran, and acetone.

12. The lithium-ion battery preparation method of claim 9, wherein the step of forming the gel electrolyte, the positive gel electrode and the negative gel electrode is performed by crosslinking the polymer by exposure to an ultraviolet radiation.

* * * * *